July 31, 1951 R. L. KELLER 2,562,723
STEAMER AND WARMING OVEN
Filed Aug. 12, 1948
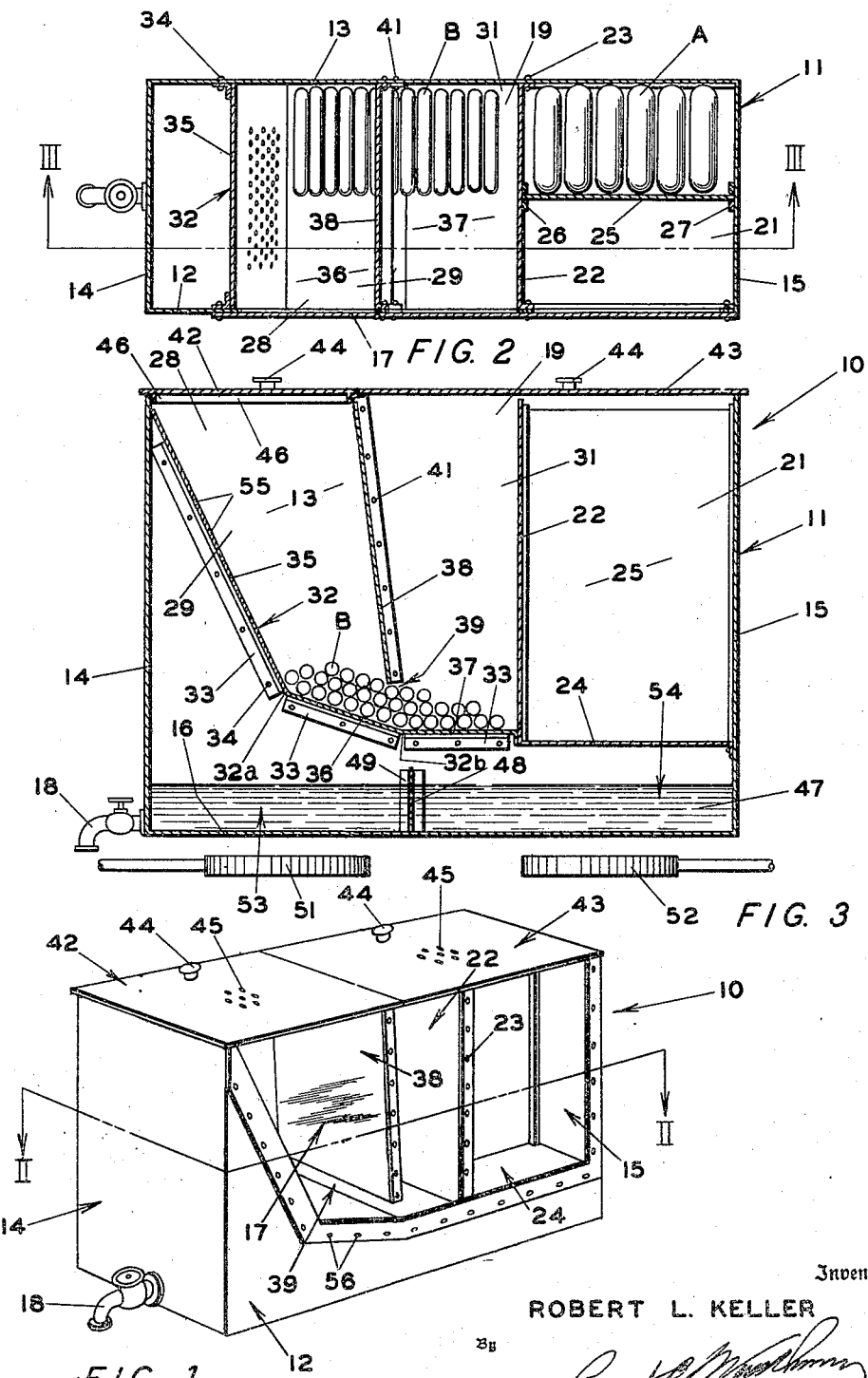
Inventor
ROBERT L. KELLER
By
Attorney Patented July 31, 1951

2,562,723

UNITED STATES PATENT OFFICE 2,562,723

STEAMER AND WARMING OVEN

Robert L. Keller, Kalamazoo, Mich.

Application August 12, 1948, Serial No. 43,905

3 Claims. (Cl. 126—369)

This invention relates in general to a warming oven and more particularly to a type thereof in which frankfurters and frankfurter buns may be kept both warm and fresh.

Present means for keeping frankfurters and buns warm over long periods of time have not been wholly satisfactory for one or more of many reasons. For example, the frankfurters often become dehydrated, tough, soggy, strong tasting, burnt or reduced in size. The buns often become dry, hard, stale or burnt. Thus, after having been held in readiness for immediate serving during a substantial part of one day, neither the frankfurters nor the buns are in fit condition to be kept over night and served on the following day.

It is also significant that the present means for warming frankfurters and buns usually comprises two separate pieces of equipment which often are not easily transportable.

Accordingly, a primary object of this invention is to provide an easily transportable, combination steamer and warming oven in which both frankfurters and buns may be kept warm for long periods of time without subjecting either to any of the harmful effects normally encountered in present types of warming devices.

A further object of this invention is to provide a warming oven as aforesaid which can be fabricated inexpensively, used any place where there is a source of heat, such as a hot plate or stove, and can be cleaned quickly and easily.

A further object of this invention is to provide a warming oven as aforesaid in which the oldest, hence the warmest, frankfurters are automatically made most available for use.

A further object of this invention is to provide a warming oven as aforesaid in which the temperature and humidity of the frankfurters and buns can be accurately and automatically controlled.

A further object of this invention is to provide a completely enclosed warming oven as aforesaid in which the contents are visible.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided a rectangular container or chest having a pair of hinged covers and a plurality of compartments in which frankfurters and buns may be placed. The bottom of the container is filled with water which, when heated, both warms and humidifies the contents of one or both compartments.

For illustration of a preferred embodiment of my invention, attention is directed to the accompanying drawings in which:

Figure 1 is an oblique view of the said combination steamer and warming oven to which this invention relates.

Figure 2 is a sectional view taken along the line II—II of Figure 1.

Figure 3 is a sectional view taken along the line III—III of Figure 2.

Construction

The warming oven 10, shown in Figure 1, is comprised of a rectangular chest 11 having side walls 12 and 13, end walls 14 and 15 (Figure 2) and a bottom 16. The side wall 12 is preferably, but not necessarily, provided with a window 17, which may be made of any suitable transparent material, such as glass or a transparent plastic, such as methyl methacrylate. The exact shape and other details of the window 17 will be disclosed more fully hereinafter.

A conventional drain cock 18, communicating with the interior of the chest, is preferably mounted on one of the end walls, here the end wall 14, in a conventional manner adjacent to the bottom 16. The chest chamber 19 is subdivided into a plurality of compartments (Figures 2 and 3) into which, and from which, the frankfurters and buns may be placed or removed.

A bun compartment 21, which is located at one end of the chest chamber 19, preferably adjacent to the end wall 15, has an inner wall 22 substantially parallel to, and spaced from, said end wall 15 and extending from the upper edges of the sidewalls 12 and 13 down to a point close to the bottom 16. In the illustrated embodiment of my invention, wherein the chest is 26 inches long, 19 inches high and 10 inches wide, the point is about four inches from the bottom 16. The bun compartment 21 has a bottom partition 24 which is substantially parallel to the bottom 16 and extends between the lower edge of the inner wall 22 and the end wall 15. The inner wall 22 and the bottom partition 24, which are preferably substantially perpendicular to the side walls 12 and 13, may be secured thereto by rivets 23, or any other suitable means such as welding or cementing.

The bun compartment 21 may be provided with a vertically removable partition 25 which is preferably parallel to the side walls 12 and 13 and approximately midway there between. The partition 25 is slidably supported in a vertical position upon the inner wall 22 and the end wall 15 between the partition slides 26 and 27, respectively. With the partition 25 in position (Figure 2), small buns A may be placed on either side thereof within the compartment 21. With the partition 25 removed, larger buns may be stored therein. A frankfurter hopper 28 (Figures 2 and 3) is provided within the chest chamber 19 between the bun compartment inner wall 22 and the chest chamber end wall 14. The frankfurter hopper 28 is divided into a supply compartment 29 and a dispensing compartment 31 by means of the dispensing wall or partition 38. A frankfurter compartment floor 32 slopes downwardly at a steep angle from a point near the upper edge of the end wall 14 to a point spaced above said bottom 16 and about midway between said end wall 14 and said dispensing wall 38. The floor 32 then extends at a lesser angle beneath said supply compartment and dispensing compartment across to the inner wall 22 which it engages near the lower end thereof.

The floor 32 which is preferably made of material such as sheet metal or fine mesh screen, is removably supported upon brackets 33 which may be secured to said side walls by rivets 34, or any other suitable means such as cementing or welding. The floor 32, in the illustrated embodiment of the invention, is bent along two lines at 32a and 32b, which lines are parallel to each other and to the inner wall 22 thereby providing three non-parallel surfaces. The first or steep surface 35 of the floor 32 slopes downwardly from a point of engagement with the end wall 14 near the upper edge thereof at an angle of approximately 60 degrees thereto, and covers approximately ⅓ of the distance between the end wall 14 and the inner wall 22. The second, or intermediate, surface 36, which has a very moderate slope of about 15 degrees to the horizontal, extends from, and is preferably integral with, the lower edge of the steep surface 35, approximately half the remaining distance to the inner wall 22. The third or horizontal surface 37 is integral with, or connected to, the second surface 36 and extends between it and the inner wall 22. Said horizontal surface 37 is substantially parallel with the chest bottom 16 and is preferably only slightly further from said bottom than is the lower wall 24. Thus, the floor 32, which is urged by gravity toward the bun compartment 21, bears against the inner wall 22 along the adjacent edge of the horizontal surface 37.

The dispensing wall 38 is disposed at an angle to the vertical in the same direction as that of the surface 35 but of less magnitude. In the illustrated embodiment the angle from the vertical of the partition 38 is about one-third that of the surface 35. The wall 38 extends downwardly from the upper edges of the side walls 12 and 13 toward the intermediate surface 36 of the sloping floor 32. The lower edge of the dispensing wall 38 is preferably spaced from said intermediate surface 36, when the floor 32 is in place upon the brackets 33, so as to provide a frankfurter slot 39 through which the frankfurters B (Figure 3) may roll from the supply compartment 29 into the dispensing compartment 31. The exact position of the dispensing wall 38 with respect to the intermediate surface 36 may be varied as desired or required, but said dispensing wall preferably lies within a plane which intersects said intermediate surface 36 near the lower edge thereof. The dispensing wall 38, which is preferably substantially perpendicular to the side walls 12 and 13, may be secured thereto by the rivets 41 or any other suitable means, such as welding or cementing.

The chest 11 (Figure 3) is provided with a supply top 42 and a dispensing top 43, adjacent to said supply top, which are preferably, but not necessarily, hinged upon the side wall 12 along the upper edge thereof. The supply top 42 preferably covers the frankfurter supply compartment 29 (Figure 2) defined by the end wall 14, the dispensing wall 38 and the side walls 12 and 13. The dispensing top 43 covers both the frankfurter dispensing compartment 31 and the bun compartment 21. The tops 42 and 43, which may have handles 44 and vent holes 45, may be provided with downwardly extending flanges, such as the flange 46 on the supply top 42.

A water compartment 47 (Figure 3) is provided within the chest 11 between the bottom 16 thereof and the bun partition 24 and floor 32 of the frankfurter hopper 28, respectively. A removable partition 48, which is substantially parallel with the end walls 14 and 15, is slidably supported in a vertical position between the side walls 12 and 13 by means of the slides 49. The partition 48, which rests upon the chest bottom 16, may be positioned as desired with reference to the end walls 14 and 15, but is preferably approximately midway therebetween and will usually be longitudinally intermediate the lower edges of the dispensing wall 38 and the inner wall 22. The partition 48 extends upwardly from the chest bottom 16 toward, but preferably does not contact, the frankfurter hopper floor 32.

A pair of heating units 51 and 52 (Figure 3), which may be gas burners or electric plates, may be placed under the first portion 53 and second portion 54, respectively, of the water compartment 47, which portions lie on opposite sides of the removable partition 48.

A plurality of vapor openings 55 are provided in the steep surface 35 through which the hot water vapor or steam rising from the water compartment may pass when the warming oven is in operation. Similar openings may be provided in the second surface 36 and horizontal surface 37 if desired or required.

To provide a window, the metal of the side wall 12 is preferably cut away from the upper edge thereof down to within a short distance, such as a half inch, above the bottom partition 24 of the bun compartment and the frankfurter hopper floor 32 (Figure 1). This opening is covered with a transparent material 17, such as methyl methacrylate, which is secured to the side wall 12 by the rivets 56, or any other suitable means such as cement. An appropriate sealing compound may be used between the window and the side wall in a conventional manner to prevent leakage of moisture. Thus, the contents of the bun compartment 21 and the frankfurter hopper 28 are completely visible from one side of the warming oven 10.

The various parts of the warming oven, such as the side walls, end walls, bottom, top, and partitioning members, exclusive of the window 17, may be fabricated from any suitable material, such as galvanized sheet metal or stainless steel, which will resist corrosion and moderate heat but is easy to clean and not too difficult to handle either during or after fabrication.

Operation

Before operating the warming oven 10, the floor 32 is removed through the supply compartment 29 and the removable partition 48 is removed from the water compartment 47. The drain cock 18 is closed and water is introduced into the water compartment 47 to a depth of two or three inches for an oven of the size of the illustrated embodiment. The warming oven 10 is then placed upon suitable heating units 51 and 52 and the partition 48 and sloping floor 32 are returned to their respective positions. The bun compartment 21 is filled with buns A and the supply compartment 29 of the frankfurter hopper 28 is filled with frankfurters B. The tops 42 and 43 are closed and the heating units 51 and 52 are then turned on to predeterminable intensities. The removable partition 48 makes it possible to maintain the temperature of the water within the first and second portions 53 and 54 at different levels. Suitable thermostatic control, not shown, may be provided to maintain the water within the said first and second portions at specified temperatures which temperatures may be determined and based upon the most efficient operation of the warming oven. The moist, warm vapor or steam from the water in the first portion 53, which is normally held at a somewhat higher temperature than the water in the second portion 54, rises and passes through the vapor openings 55 thereby heating and humidifying the frankfurters B within the supply compartment 29. The heated frankfurters are urged by gravity to roll, one or more at a time, through the slot 39 beneath the lower edge of the dispensing wall 38 into the dispensing compartment 31. As the frankfurters are removed from the dispensing compartment 31 more frankfurters roll through the frankfurter slot 39. A small amount of moisture will pass through the frankfurter slot 39 and between the upper edge of the inner wall 22 and the dispensing top 43 into the bun compartment 21 to prevent too rapid dehydration of the buns A which are stored therein. The heated water in the water compartment second portion 54 warms the bun compartment 21 with a double boiler effect which, by limiting the intensity of the heat applied, also prevents rapid dehydration of the contents of the bun compartment. The removable partition 25 in the bun compartment 21 makes it possible to warm buns on one side of the partition while using buns already warmed on the other side thereof. Thus, the oldest and warmest buns are enabled to be used first. The dispensing wall 38 also provides for the consumption of the oldest and warmest frankfurters held in the supply compartment of the frankfurter hopper 28.

When the heating units under the warming oven are turned off, the frankfurters and buns may be easily transferred to suitable storage and the floor 32 and the removable partitions 25 and 48 may be removed from the chest 11. The drain cock 18 is opened to drain the water from the water compartment 47. It may be readily seen (Fig. 3) that with only the bun compartment walls and the dispensing wall remaining within the chest 11, the interior of the chest may be easily and quickly cleaned.

It will be recognized that the warming oven 10 may be fabricated without the window 17 and without the removable partitions 25 and 48. If the removable partition 48 is omitted from the water compartment 47, the water held therein will be at substantially the same temperature throughout. It will be further recognized that due to some transfer of heat through the partition 48, it will be possible to effect some warming of the water in the portion 54 solely from the portion 53 of the water compartment. Hence, with the heating unit 52 turned off, the water under the bun compartment will be kept warm, but at a lower temperature than that under the frankfurters for an indefinite period.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. In a warming and steaming oven for frankfurters and frankfurter buns, the combination comprising: an oven chest having first and second end walls, a pair of side walls and a bottom; a bun compartment inner wall extending between and secured to said side walls, said inner wall being parallel with and spaced from said first end wall and having its lower edge spaced from said bottom; a horizontal partition extending between and secured to said side walls, said horizontal partition being parallel with and spaced from said bottom and extending between said inner wall lower edge and said first end wall to constitute a bottom for said bun compartment; a vertical partition resting upon said horizontal partition, and extending perpendicularly between and being removably supported upon said inner wall and said first end wall; a frankfurter hopper floor having first and second portions extending between and removably supported upon said side walls, said first portion having an upper edge engaging said second end wall near the top thereof and having a lower edge spaced from both said second end wall and said bottom, and having also a plurality of openings therethrough and being steeply inclined with respect to said bottom, and said second portion being substantially horizontal and extending from the lower edge of said first portion to said inner wall near said lower edge thereof, and being spaced from said bottom; a dispensing wall extending between and secured to said side walls intermediate said inner wall and said second end wall, being slightly inclined upwardly away from said inner wall, and having its lower edge spaced from the upper surface of said second portion of the hopper floor; a supply top pivotally supported upon the upper edge of one side wall and covering the space between the upper edges of said second end wall and said dispensing wall, said supply top having a handle and a plurality of vent holes; a dispensing top pivotally supported upon the upper edge of said one side wall adjacent to said supply top and covering the space between the upper edges of said dispensing wall and said first end wall, said dispensing top having a handle and a plurality of vent holes; a vertical panel longitudinally intermediate the lower end of said dispensing wall and said inner wall, resting upon said bottom, extending perpendicularly between and being slidably supported upon said side walls and extending toward but not contacting the lower surface of said hopper floor; a window in said one side wall exposing a portion of the chest interior; and a drain cock communicating with the interior of said chest and secured to one end wall adjacent to said bottom.

2. In a warming and steaming oven for frankfurters and buns, the combination comprising: an oven chest having a pair of end walls, a pair of side walls, a bottom and a pair of adjacent tops pivotally secured to the upper edge of one side wall; a bun compartment means within said chest adjacent to one end wall and spaced from said bottom; a removable, vertically disposed, partition slidably supported within said bun compartment; a frankfurter hopper within said chest having a removable, sloping floor extending downwardly from engagement with the other end wall to engagement with a wall of said bun compartment, said floor having a plurality of openings therethrough and being spaced from said bottom; an upwardly and downwardly disposed dispensing wall secured to said side walls intermediate said other end wall and said wall of said bun compartment, and having a lower edge spaced from said floor; a removable, vertical panel engaging said bottom and said side walls and extending toward but spaced from the under side of said hopper floor; a window in one side wall providing visual access to said bun compartment and said frankfurter hopper; and a drain cock secured to said other end wall adjacent to said bottom.

3. A combination warming and steaming oven for frankfurters and buns comprising: means forming a bun compartment; means adjacent said bun compartment forming a frankfurter hopper having a removable, sloping floor and a partition intermediate its ends extending from the top thereof toward, but spaced from, said floor; a pair of adjacent tops covering said bun compartment and hopper; means providing a water compartment, extending completely under said bun compartment and said hopper floor, having a removable, vertically disposed partition engaging the sidewalls and the bottom of said water compartment intermediate the end walls thereof below and spaced from said hopper; and drain means communicating with said water compartment.

ROBERT L. KELLER.

REFERENCES CITED

The following references are of record in the file of this patent:

UNITED STATES PATENTS

| Number | Name | Date |
|---|---|---|
| 874,278 | Adams | Dec. 17, 1907 |
| 1,876,614 | Claus | Sept. 13, 1932 |
| 2,053,935 | Austin | Sept. 8, 1936 |
| 2,441,994 | DiPasquale | May 25, 1948 |
| 2,469,778 | Morici | May 10, 1949 |